United States Patent [19]
Remmers et al.

[11] Patent Number: 5,814,774
[45] Date of Patent: *Sep. 29, 1998

[54] ELEVATOR SYSTEM HAVING A FORCE-ESTIMATION OR POSITION-SCHEDULED CURRENT COMMAND CONTROLLER

[75] Inventors: Timothy M. Remmers, Winsted; Randall K. Roberts, Amston; Rajesh Rajamani, East Hartford; Roy S. Colby, Tariffville, all of Conn.

[73] Assignee: Otis Elevator Company, Farmington, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 626,749

[22] Filed: Mar. 29, 1996

[51] Int. Cl.⁶ .................................. P66B 1/34; B66B 7/04
[52] U.S. Cl. ........................... 187/292; 187/394; 187/409
[58] Field of Search ...................... 187/391, 194, 187/292, 409, 460; 361/143, 152

[56] References Cited

U.S. PATENT DOCUMENTS

| | | | |
|---|---|---|---|
| 4,750,590 | 6/1988 | Otala | 187/95 |
| 4,754,849 | 7/1988 | Ando | 187/95 |
| 5,086,882 | 2/1992 | Sugahara et al. | 187/95 |
| 5,117,946 | 6/1992 | Traktovenko et al. | 187/95 |
| 5,294,757 | 3/1994 | Skalski et al. | 187/115 |
| 5,304,751 | 4/1994 | Skalski et al. | 187/115 |
| 5,308,938 | 5/1994 | Roberts et al. | 187/115 |
| 5,321,217 | 6/1994 | Traktovenko et al. | 187/115 |
| 5,322,144 | 6/1994 | Skalski et al. | 187/115 |
| 5,329,077 | 7/1994 | Skalski et al. | 187/133 |
| 5,359,490 | 10/1994 | Oguro | 361/144 |
| 5,367,132 | 11/1994 | Skalski et al. | 187/393 |
| 5,373,123 | 12/1994 | Skalski | 187/393 |
| 5,379,864 | 1/1995 | Colby | 187/393 |
| 5,400,872 | 3/1995 | Skalski et al. | 187/393 |
| 5,439,075 | 8/1995 | Skalski et al. | 187/410 |
| 5,467,243 | 11/1995 | Skalski | 361/143 |
| 5,524,730 | 6/1996 | Roberts | 187/292 |
| 5,535,853 | 7/1996 | Skalski | 187/418 |
| 5,652,414 | 7/1997 | Roberts et al. | 187/292 |

FOREIGN PATENT DOCUMENTS

| | | |
|---|---|---|
| 0467673 | 1/1992 | European Pat. Off. . |
| 63-87483 | 4/1988 | Japan . |

OTHER PUBLICATIONS

Article of "Attitude Control System Of A Super–High Speed Elevator Car Based On MagneArtic Guides" by Inaba et al. IECON'94 of IEEE, Sep. 5–9, 1994, Bologna, Italy, pp. 1–6.

Primary Examiner—Robery Nappi
Attorney, Agent, or Firm—Francis J. Maguire, Jr.

[57] ABSTRACT

The invention provides an elevator system for controlling movement of an elevator car with respect to guide rails in an elevator hoistway, having a force-estimation or position-scheduled current command controller and a magnet driver circuit without the need for a flux sensor. The force-estimation or position-scheduled current command controller responds to a force command signal, and further responds to a sensed gap signal, for providing a force-estimation or position-scheduled current command controller signal as a current command to the magnet driver circuit. The magnet driver circuit responds to the force-estimation or position-scheduled current command controller signal, for providing a magnet driver circuit signal to control said horizontal movement of the elevator car with respect to the guide rail in the elevator hoistway, whereby the horizontal movement of the elevator car is controlled without sensing magnetic flux. Other applications include any system that uses an electromagnet to produce an attractive or repulsive force across a large air gap, such as magnetic levitation trains or shuttles, and magnetic bearings.

13 Claims, 11 Drawing Sheets

FIG. 12

ELEVATOR SYSTEM HAVING A FORCE-ESTIMATION OR POSITION-SCHEDULED CURRENT COMMAND CONTROLLER

COPYRIGHT PROTECTION NOTICE

A portion of the disclosure of this patent application contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

TECHNICAL FIELD

This invention relates to a system having active suspension control, and more particularly relates to an elevator system having active horizontal suspension control for controlling horizontal movement of an elevator car with respect to guide rails in an elevator hoistway.

BACKGROUND OF THE INVENTION

As elevators are required to move faster, there is a greater need for improved lateral suspension to provide smooth, quiet rides for passengers. Current practice is to employ a passive suspension comprised of rollers mounted with springs and dampers to the corners of the elevator car. Advanced elevator suspension concepts are being proposed and developed that employ electromagnets as active force generators in the suspension to counteract external forces acting on the elevator system. For example, an active roller guide (ARG) elevator system and an active magnetic guidance (AMG) elevator system are two such advanced suspension systems. Force generating mechanisms used for both the ARG and AMG elevator systems are electromagnet pairs that are required to generate controlled magnetic forces in the presence of relatively large air gap variations in a range of 2 to 10 millimeters.

Figure 3:
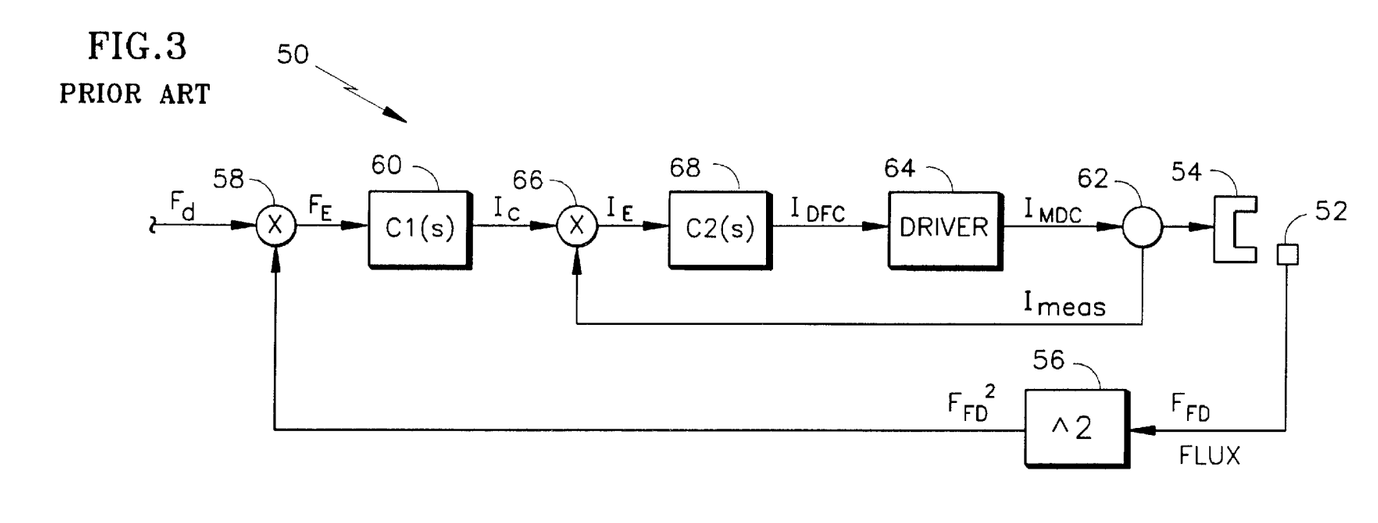
FIG. 3 is a block diagram of a known flux and current feedback compensation controller in a known magnet driver.

FIG. 3 shows a known flux and current feedback compensation controller for a magnet driver. In general, in FIG. 3, the known flux and current feedback compensation controller feeds back magnetic flux and current to regulate electromagnet currents. The flux and current feedback system utilizes an outer force control feedback loop (flux feedback using Hall effect sensors), to regulate command current for the magnets in the presence of unknown gaps. (Note that FIG. 3 is simplified by showing only one magnet).

Specifically, an elevator suspension controller (not shown in FIG. 3) of the elevator system provides a force command signal $F_d$ to the flux and current feedback compensation controller 50. The force command signal $F_d$ is indicative of a desired force to move the elevator car with respect to guide rails in an elevator hoistway. A Hall effect sensor 52 measures a flux density FD, and provides a sensed flux density signal $F_{FD}$ indicative of a magnetic force exerted by a magnet 54 on a guide rail (not shown). A squaring circuit 56 squares the sensed flux density signal $F_{FD}$, and provides a squared sensed flux density signal $FF_{FD}^2$ proportional to the sensed flux density signal $F_{FD}$. A first comparator 58 subtracts the squared sensed flux density signal $F_{FD}^2$ from the force command signal $F_d$, and provides a force error signal $F_{FE}$. A force feedback compensation processor 60 responds to the force error signal $F_{FE}$, and provides a desired force compensated current command signal $I_C$.

A current measurement circuit 62 measures a magnet driver current $I_{MDC}$, and provides a measured current signal $I_{meas}$ indicative of a measured current from a driver 64 to the magnet 54. A second comparator 66 subtracts the measured current signal $I_{meas}$ from the desired force compensated current command signal $I_C$, and provides a current error signal $I_E$. A current feedback compensation processor 68 responds to the current error signal $I_E$ and provides a driver feedback current signal $I_{DFC}$ to the driver 64. The driver 64 responds to the driver feedback current signal $I_{DFC}$, and provides the driver current signal $I_{MDC}$ to the magnet 54.

The flux and current feedback compensation controller 50 for the AMG elevator system, as well as the ARG elevator system, both use the Hall effect sensor 52 as one of the primary feedback elements to control the magnetic force (See U.S. Pat. Nos. 5,294,757, 5,304,751 and 5,308,938). The Hall effect sensor 52 is mounted in the magnetic field at a pole face of the magnet 54 and measures the local magnet flux density. In the AMG and ARG elevator systems, the force produced by the magnet 54 is roughly proportional to the square of the flux density.

However, there are four major disadvantages of using the Hall effect sensor 52 in the AMG elevator systems: First, the Hall effect sensor 52 must be located between the pole face of the magnet 54 and a reaction surface of the elevator guide rail (not shown). The location creates a severe reliability and durability concern, especially on the AMG elevator system in which the reaction surface is the elevator guide rail. The reaction surface can be moving at speeds greater than 10 meters per second (m/s) relative to the Hall effect sensor 52. Second, when using the Hall effect sensor 52 a spacer having thickness greater than the thickness of the Hall effect sensor 52 must be installed in the gap to protect the Hall effect sensor 52 from inadvertent impact. The thicker spacer reduces the useful travel of the suspension and/or requires the magnet 54 to produce magnetic force across a larger air gap. This is especially disadvantageous because the magnet force decreases as a function of the square of the air gap length. Third, the Hall effect sensor 52 requires additional wiring and connections, increasing the cost and reducing the overall reliability of the suspension control system. Fourth, the existence of the Hall effect sensor 52 on the pole face of the magnet 54 limits the achievable force generation capability of the electromagnet. The Hall effect sensor 52 must be mounted in close proximity to the active electromagnet 54—on the reaction plate (armature) in the case of the ARG elevator system, and directly on the magnet pole face in the case of the AMG elevator system. The limited temperature range of the Hall effect sensor 52 limits the allowable temperature rise of the magnet, and therefore limits the maximum magnet excitation. The ARG elevator systems have similar problems.

The disadvantages discussed above are difficulties in the ARG elevator systems, but prove to be serious limitations to the implementation of AMG elevator systems.

DISCLOSURE OF INVENTION

The invention provides a new and unique method for controlling forces produced by electromagnets in large gap applications without using a Hall effect sensor and its associated feedback loop.

In particular, the invention features an elevator system for controlling horizontal movement of an elevator car with respect to guide rails in an elevator hoistway, having a force-estimation or position-scheduled current command controller and a magnet driver circuit. The force-estimation or position-scheduled current command controller responds to a force command signal, and further responds to a sensed gap signal, for providing a force-estimation or position-scheduled current command controller signal. The magnet driver circuit responds to the force-estimation or position-scheduled current command controller signal, for providing a magnet driver circuit signal to control the horizontal movement of the elevator car with respect to the guide rails in the elevator hoistway.

In one embodiment, the invention includes a force-estimation processor that responds to the sensed gap signal and a sensed magnet driver current signal, for providing a force-estimation processor signal indicative of an estimated force used to control the horizontal movement of the elevator car with respect to the guide rails in the elevator hoistway. The force-estimation processor may be implemented in hardware or software.

In another embodiment, the invention includes a position-scheduled current command controller that responds to the force command signal and the sensed gap signal, for providing a position-scheduled current command controller signal as a current command to the magnetic driver circuit. The position-scheduled current command controller may be implemented in hardware or software to control the movement of the elevator car with respect to the guide rails in the elevator hoistway.

One significant advantage of the invention is that it eliminates the need for the Hall effect sensor.

Accordingly, the invention comprises the features of construction, combination of elements, and arrangement of parts which will be exemplified in the construction hereinafter set forth, and the scope of the invention will be indicated in the claims.

BRIEF DESCRIPTION OF THE DRAWING

For a fuller understanding of the nature of the invention, reference should be made to the following detailed descriptions taken in connection with the accompanying drawings, not in scale, in which.

BEST MODE FOR CARRYING OUT THE INVENTION

Figure 1:
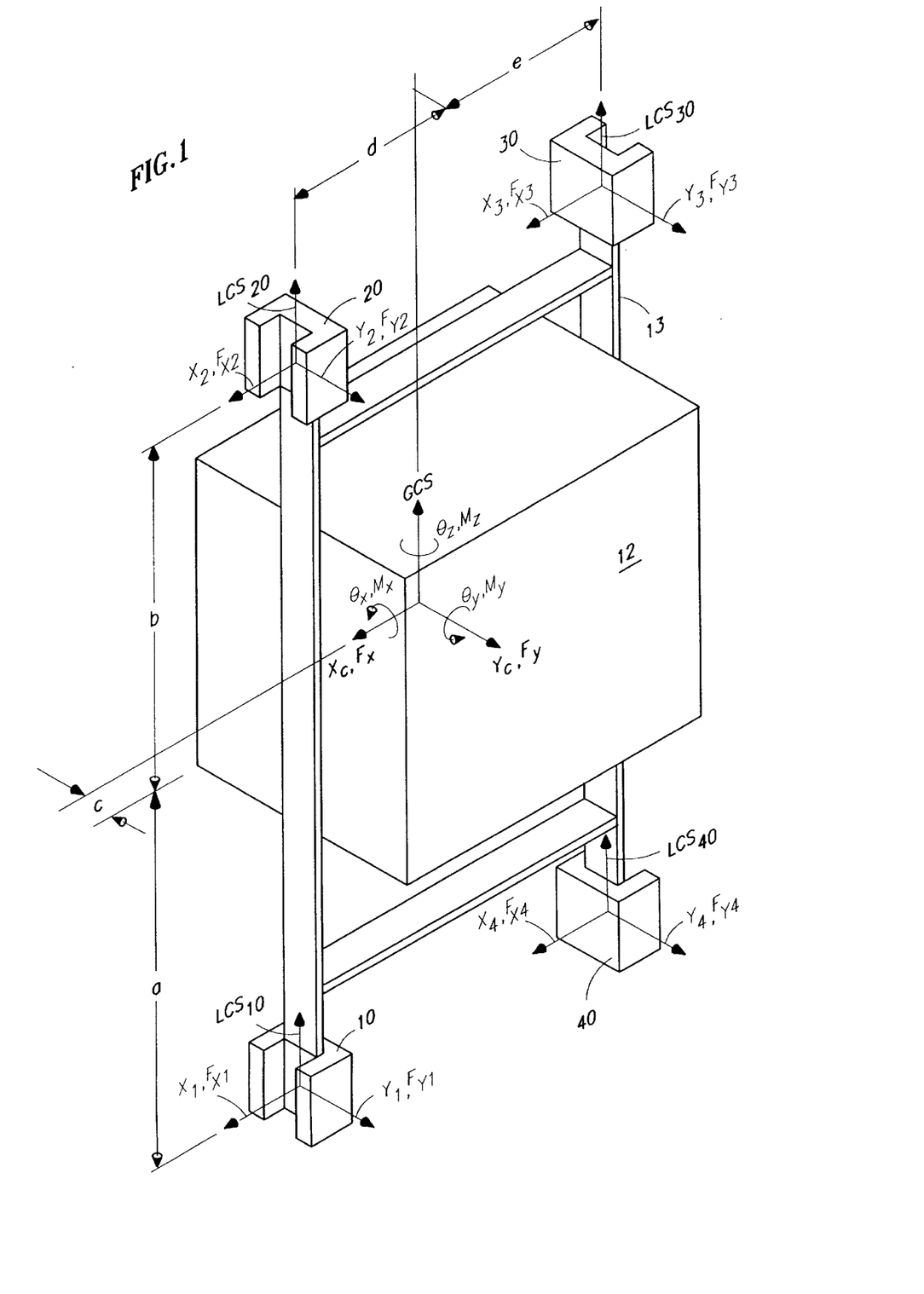
FIG. 1 is a schematic diagram of an elevator car that moves with respect to guide rails in an AMG elevator system.

An AMG Elevator System in General:

FIG. 1 shows an elevator car 12 for an AMG elevator system shown and is described in a U.S. patent application having Ser. No. 08/292,660, filed Aug. 18, 1994, and hereby incorporated by reference. The elevator car 12 has a car frame 13 with four guide heads 10, 20, 30, 40, which are shown in this example as magnetic guide heads. In general, the elevator car 12 includes a car frame 13 that operates on vertical guide rails (not shown) mounted at opposite sides of an elevator shaft or hoistway (not shown) of a building (not shown). The four guide heads 10, 20, 30, and 40 are mounted on the car frame 13 to guide the car along the rails and to reduce the vibrations transmitted to the car.

As shown, the rigid body motion of the elevator car 12 is kinematically defined in five degrees of freedom of a global coordination system (GCS) having X, Y, Z axes by side-to-side translation along the X axis, front-to-back translation along the Y axis, a pitch rotation about the X axis, a roll rotation about the Y axis, and a yaw rotation about the Z axis. The GCS may have its origin at the geometric (or mass) center of the elevator car 12 or at any other convenient origin. It should be realized that the choice of a coordinate system, though not arbitrary, need not be rectangular, although it is the most logical and convenient. The side-to-side linear translation $X_C$ is measured along the X axis in the GCS and a force $F_X$ is defined along the X axis. The front-to-back linear translation $Y_C$ is measured along the Y axis in the GCS, and a force $F_Y$ is defined along the Y axis. The pitch rotation $\theta_X$ is rotationally measured about the X axis in the GCS, and a moment $M_X$ is defined about the X axis. The roll rotation $\theta_Y$ is rotationally measured about the Y axis in the GCS, and a moment $M_Y$ is defined about the Y axis. The yaw rotation $\theta_Z$ is measured about the Z axis in the GCS, and a moment $M_Z$ is defined about the Z axis. Each of the three arrows shown in FIG. 2 indicates a positive moment about the respective axes. (Note that for the purpose of this discussion the measurement and motion of the elevator car 12 are not controlled by the AMG system with respect to translations along the Z axis.)

In addition, each guide head 10, 20, 30, 40 has a respective local coordinate system $LCS_{10}$, $LCS_{20}$, $LCS_{30}$, $LCS_{40}$, having $x_i$, $y_i$, $z_i$ axes. For example, the guide head 10 has a local coordinate system $LCS_{10}$ having an $x_1$ axis and a $y_1$ axis with forces $F_{x1}$ and $F_{y1}$ respectively defined along these axes, as shown. The guide head 20 has a local coordinate system $LCS_{20}$ having an $x_2$ axis and a $y_2$ axis with forces $F_{x2}$ and $F_{y2}$ respectively defined along these axes, as shown. The guide head 30 has a local coordinate system $LCS_{30}$ having an $X_3$ axis and a $y_3$ axis with forces $F_{x3}$ and $F_{y3}$ respectively defined along these axes, as shown. The guide head 40 has a local coordinate system $LCS_{40}$ having an $x_4$ axis and a $y_4$ axis with forces $F_{x4}$ and $F_{y4}$ respectively defined along these axes, as shown.

For each of the four guide heads 10, 20, 30, 40, its three respective electromagnets produce forces $F_{x1}$, $F_{y1}$, $F_{x2}$, $F_{y2}$, $F_{y3}$, $F_{x4}$ and $Fy_4$ along the respective local $x_i$ and $y_i$ axes. It is assumed that the local forces along the $x_i$ and $y_i$ axes act through the origin of its respective local coordinate system LCSI. It should be realized that one could easily account for any offset in the local $z_i$ axis between the local forces due to magnet positioning by adding additional length parameters in this kinematic characterization.

The local coordinate systems $LCS_{10}$, $LCS_{20}$, $LCS_{30}$, $LCS_{40}$ are related to the GCS based on five lengths a, b, c, d and e, as shown in FIG. 1. The lengths a and b define the lever arms for the pitch rotation $\theta_X$ about the X axis and the roll rotation $\theta_Y$ about the Y axis. The lengths c, d and e define the lever arms for the yaw rotation $\theta_Z$ about the Z axis. For the typical case, one assumes a=b, d=e and c=0.

In one embodiment described in U.S. Ser. No. 08/292,660, the position of the elevator car 12 is measured in three of the four local coordinate systems $LCS_{10}$, $LCS_{20}$, $LCS_{30}$, and coordinating local forces $F_{x1}$, $F_{x2}$, $F_{y1}$, $F_{y2}$, $Fy_3$ are applied in the same three local coordinate systems $LCS_{10}$, $LCS_{20}$, $LCS_{30}$. The measurements are used to determine the deviation of the elevator car 12 from a desired position in the GCS, and the forces necessary to move the elevator car 12 back to the desired position in the GCS.

Figure 2:
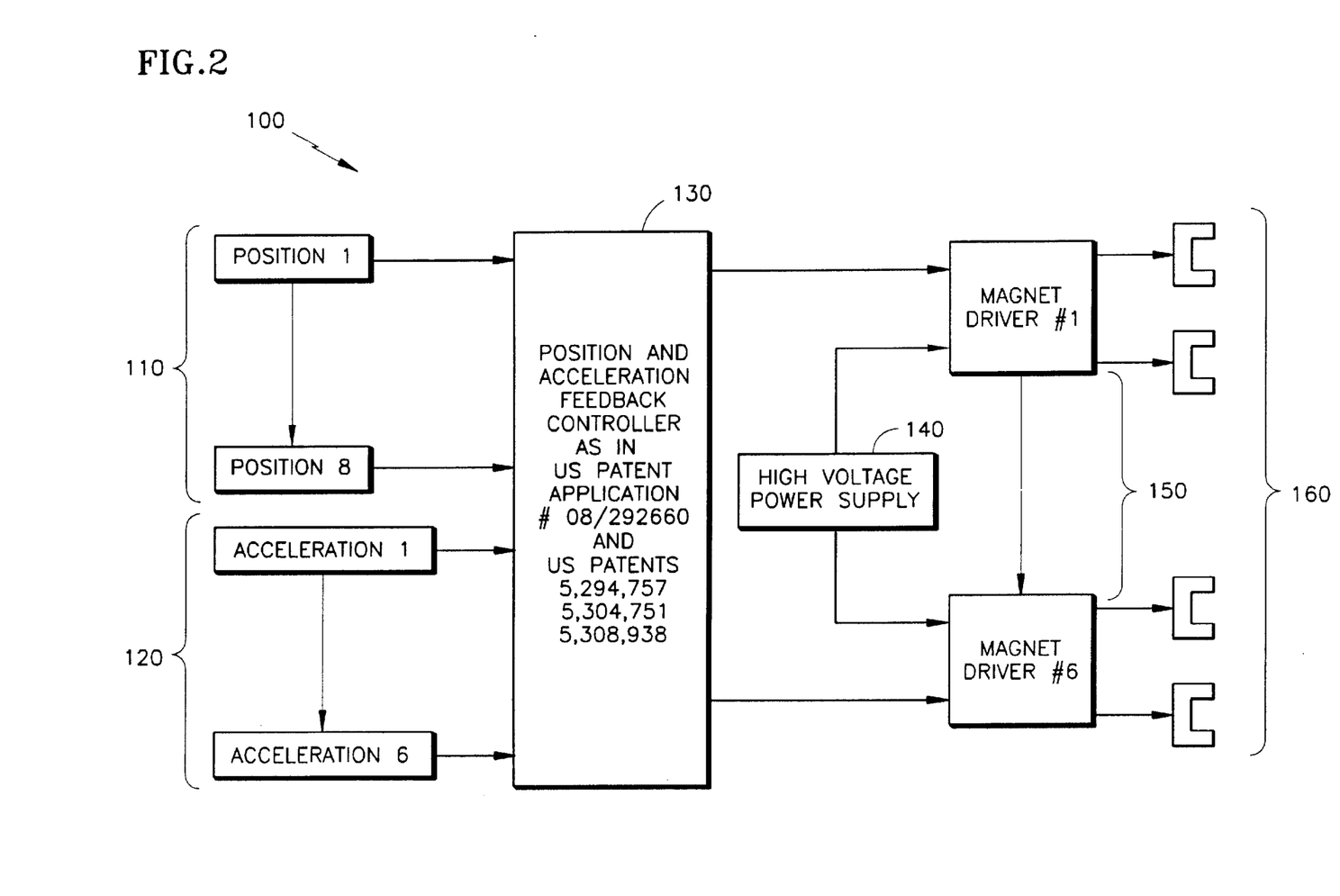
FIG. 2 is a block diagram of a circuit for controlling the movement of the elevator car in FIG. 1 with respect to the guide rails.

FIG. 2 shows an example of a coordinated controller 100 described in U.S. Pat. No. 5,652,414 for controlling the movement of the elevator car 12 shown in FIG. 1 in the AMG elevator system. In FIG. 2, the coordinated controller 100 includes position sensors 110 and acceleration sensors 120, a position and acceleration feedback controller 130, a high voltage power supply 140, magnet drivers 150, and electromagnets 160. The position sensors 110 are known in the art, and an example thereof is shown and described in U.S. Pat. No. 5,294,757, hereby incorporated by reference. The position and acceleration feedback controller 130 keeps the car frame 13 centered between the guide rails and minimizes the lateral vibrations, and is shown and described in U.S. Pat. No. 5,652,414. Other position and acceleration feedback controllers are also shown and described in U.S. Pat. Nos. 5,294,757; 5,304,751 and 5,308,938, which are also hereby incorporated by reference.

As discussed above in detail, FIG. 3 shows a known flux and current feedback compensation controller for the magnet drivers 150 shown in FIG. 2.

The Force-Estimation or Position-Scheduled Current Command Controller

Figure 4:
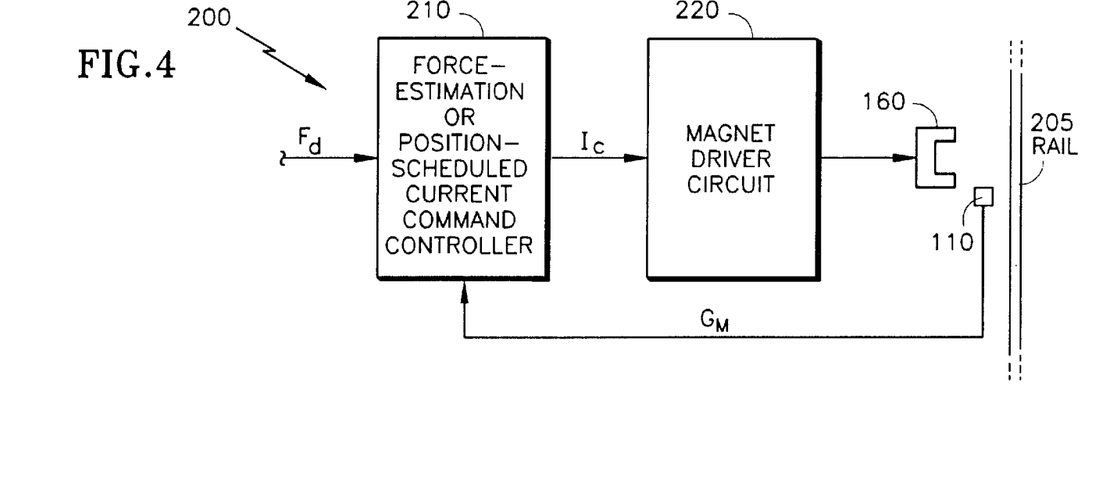
FIG. 4 is a block diagram of a current command controller 200 of the present invention.

FIG. 4 shows a block diagram of the present invention in its broadest context. As shown, the present invention provides a current command controller 200 to regulate currents to an electromagnet 160 that serves as a force generator in the AMG elevator system.

As shown in FIG. 4, the current command controller 200 has a force-estimation or position-scheduled current command controller 210 and a magnet driver circuit 220. The force-estimation or position-scheduled current command controller 210 responds to a force command signal $F_d$, and further responds to a sensed gap signal $G_m$, for providing a current command signal $I_C$. As described below, the current command signal $I_C$ takes the form of either a force-estimation current command controller signal or a position-scheduled current command controller signal, and is indicative of a current command to the magnet driver circuit for driving electromagnets to control the elevator car 12 (FIG. 1) with respect to the guide rail 205 in the elevator hoistway (not shown). The position and acceleration feedback controller 130 in FIG. 2 provides the force command signal $F_d$, which is indicative of a horizontal force to move the elevator car (FIG. 1) with respect to the guide rail 205 in the elevator hoistway (not shown). One of the position sensors 110 in FIG. 2 provides the measured gap signal $G_m$ of FIG. 4, which is indicative of an actual gap of the elevator car 12 (FIG. 1) with respect to the guide rail 205 in the elevator hoistway (not shown).

The magnet driver circuit 220 responds to the current command signal $I_C$, for providing a magnet driver circuit signal to the magnet 160 in FIG. 4 to control movement of the elevator car 12 with respect to the guide rails (not shown) in the elevator hoistway (not shown).

In effect, the present invention uniquely provides two different control systems to regulate the bi-directional force generated by the electromagnets 160 operating over relatively large air gaps without the need for Hall effect sensors. FIGS. 5(a), 5(b) and 6–9 show embodiments in which the current command controller 200 has a magnetic-force estimation current command controller 210/300 to regulate currents to electromagnets 160 that serve as force generators. FIGS. 6–8 and 10–11 show an embodiment in which the current command controller 200 has a position-scheduled current command controller 210/400. These embodiments use an idealized relationship between the magnetic force produced given the air gap between the magnet and a reaction surface (e.g., the elevator guide rail) and command currents for the magnets. The force estimation approach may use existing current and position sensing elements in the ARG and AMG elevator systems. However, it should be realized that the present invention is also applicable to elevator systems having a plurality of active guides of any type, including active roller guides, active slide guides, etc. Moreover, the scope of the invention is also not intended to be limited to only current commands, because embodiments are envisioned in which voltage commands may be used for controlling the elevator car 12 (FIG. 1) with respect to the guide rails 205 in the elevator hoistway (not shown).

FIG. 5: Force-Estimation Current Command Controller 300

Figure 5A:
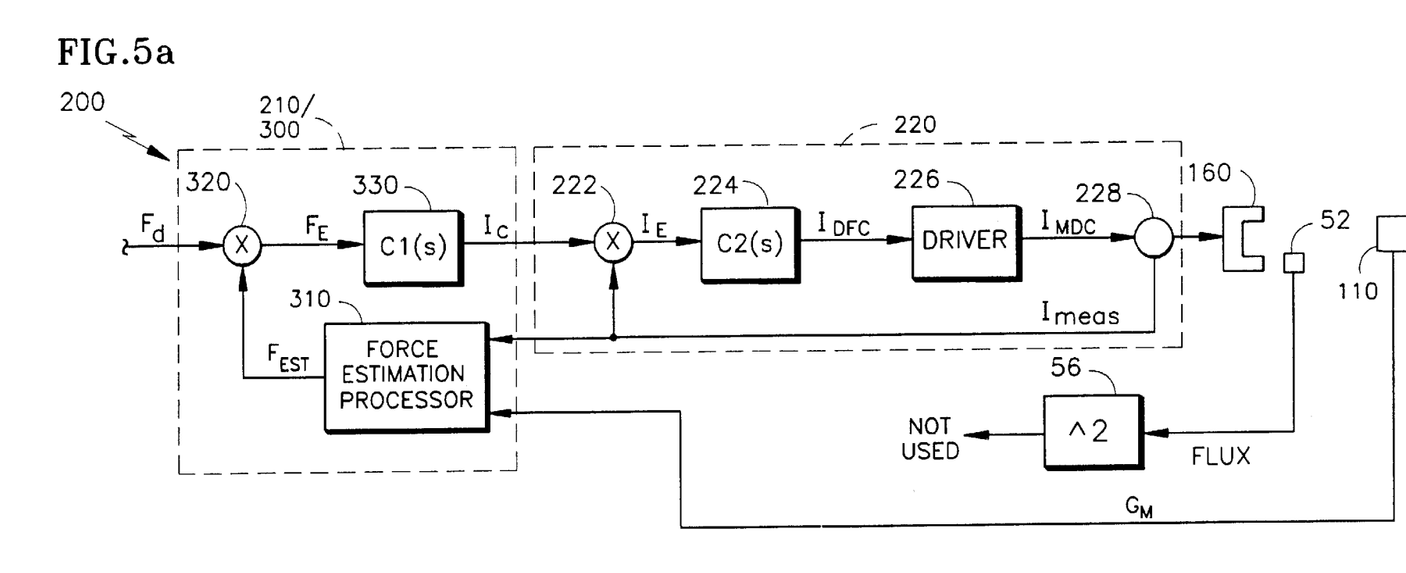
FIG. 5a is a block diagram of one embodiment of a force-estimation current command controller 210/300 which is one embodiment of the current command controller 200 in FIG. 4.

FIG. 5a shows an embodiment of the invention in which the current command controller 200 has a force-estimation current command controller 210/300 that includes a force-estimation processor 310, a force comparator 320 and a force feedback compensation processor 330.

The force-estimation processor 310 responds to the sensed gap signal $G_m$ from a gap sensor 110, and further responds to a sensed or measured magnet driver current signal $I_{meas}$ from a magnetic current sensor 228, for providing a force-estimation processor signal indicative of an estimation of the horizontal force to control the elevator car 12 with respect to the guide rails in the elevator hoistway. The force comparator 320 is known in the art and subtracts the force-estimation processor signal $F_{est}$ from the force command signal $F_d$ provided by the position and acceleration feedback controller 130 in FIG. 2, for providing a force error signal $F_E$ indicative of comparisons of the force command signal $F_d$ and the force-estimation processor signal $F_{est}$ to control the elevator car 12 with respect to the guide rails in the elevator hoistway (not shown). The force feedback compensation processor 330 responds to the force error signal $F_E$, for providing a force feedback compensation processor signal as a current command $I_C$ to the magnet driver circuit 220.

Figure 6:
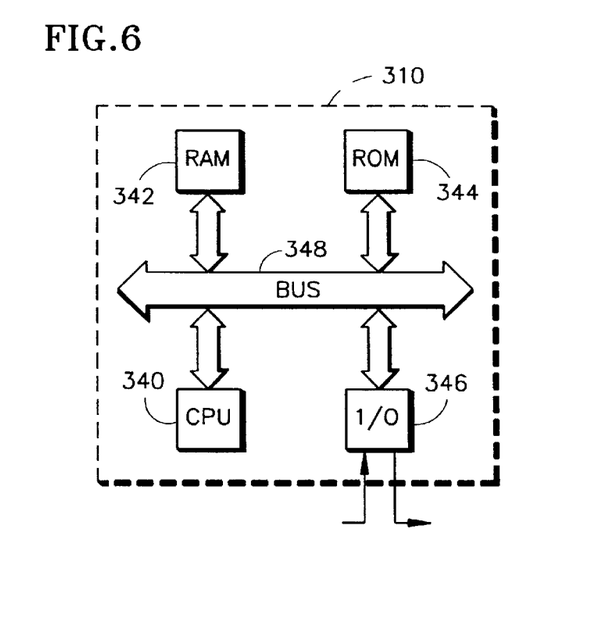
FIG. 6 is a block diagram of a microprocessor architecture for the force-estimation current command controller 210/300 of FIG. 5.

The force estimation processor 310 may be implemented in hardware or software. When implemented in software, a typical microprocessor architecture is used, as generally shown in FIG. 6. For example, the force estimation processor 310 may include a microprocessor (CPU) 340, a Random Access Memory (RAM) 342, a Read Only Memory (ROM) 344, an input/output controller (I/O) 346, and an address, data and control bus (BUS) 348 for connecting the microprocessor (CPU) 340, the Random Access Memory (RAM) 342, the Read Only Memory (ROM) 344 and the input/output controller (I/O) 346. One advantage of implementing the force-estimation processor 310 in software is that it can easily be updated and adapted over time by simply adjusting the software program. An implementation of the force-estimation processor 310 using hardware is discussed below with respect to FIG. 9.

The force feedback compensation processor 330 may similarly be implemented in software with the same or a separate microprocessor such as shown in FIG. 6. The scope of the invention is not intended to be limited to any particular embodiment of the force-estimator processor 310 or the force feedback compensation processor 330, or whether it is implemented in hardware or software, or a combination thereof.

The magnet driver circuit 220 is known in the art of elevator systems and includes a current-error comparator 222, a current feedback compensation processor 224, a driver 226 and a magnet current sensor 228. The current-error comparator 222 subtracts the measured magnet driver current signal $I_{meas}$ indicative of the measured magnet driver current applied to electromagnets 160 from the current command signal $I_C$, for providing a current error signal $I_E$. The current feedback compensation processor 224 responds to the current error signal $I_E$, for providing a current feedback compensation processor signal $I_{FC}$. The driver 226 responds to the current feedback compensation processor signal $I_{FC}$, for providing a driver signal to the magnet 160 that provides a magnet force to control movement of the elevator car 12 (FIG. 1) with respect to the guide rails in the elevator hoistway. The magnetic current sensor 228 responds to the magnet driver current, for providing the sensed or measured magnet driver current signal $I_{meas}$ to the current-error comparator 222. As shown, the "not used" in FIGS. 5a, 5b indicates that the force-estimation current command controller 210/300 replaces the Hall effect sensor 52 and the squaring circuit 54 shown in FIG. 3, which are no longer needed.

Figure 12:
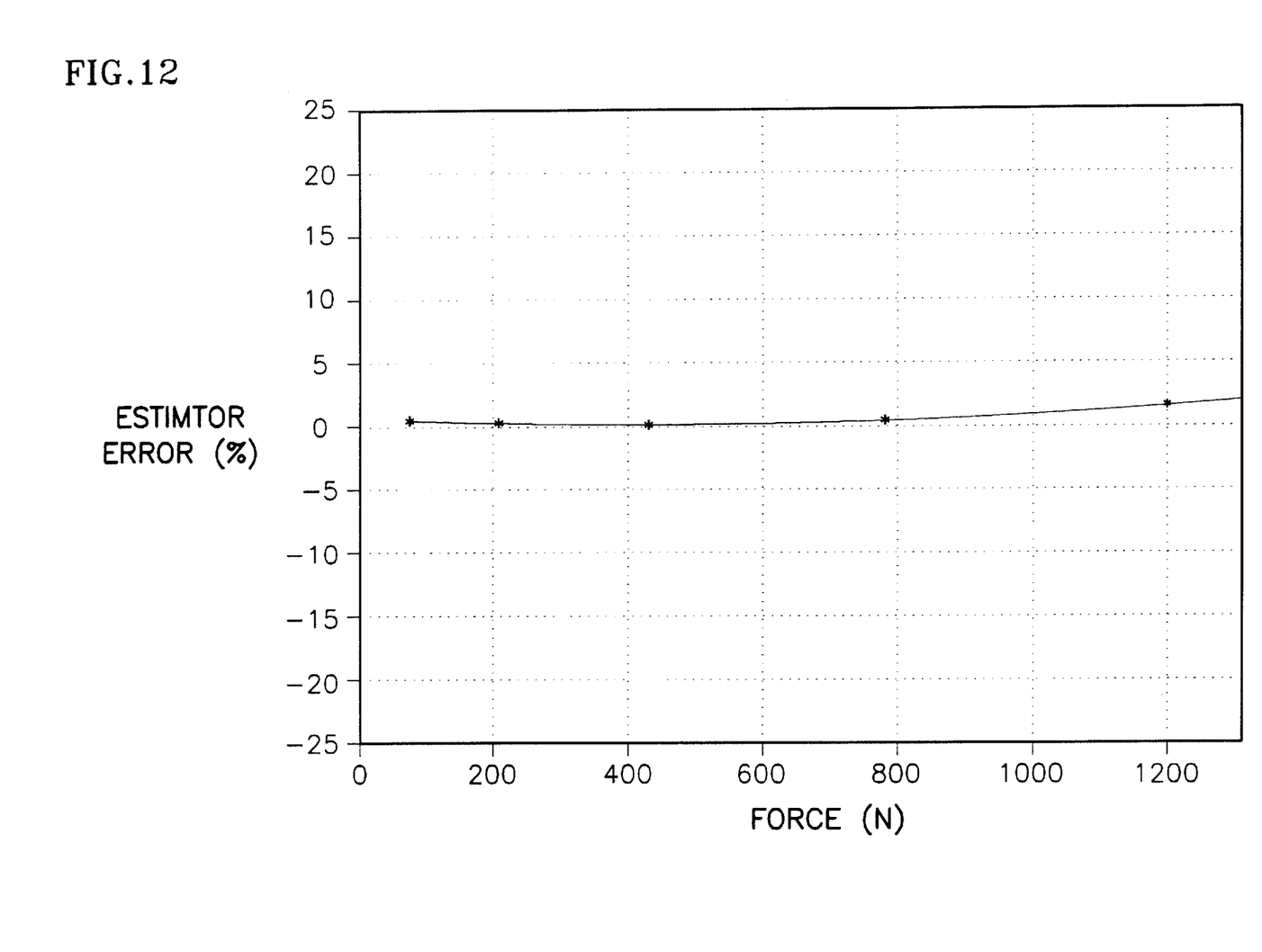
FIG. 12 shows a graph of side-to-side AMG magnet performance.

In operation, the force-estimation processor 310 takes the sensed gap signal $G_m$ and the measured magnet driver current signal $I_{meas}$, and computes a force-estimation processor signal using a derived Equation 1.0, as follows:

$$\text{Force} = K_{mag} * (I_C/G_{mag})^2 \quad \text{(Eq. 1)},$$

where the Force represents a force scaled in Newtons, $K_{mag}$ represents a proportionality constant (100 for the smaller Front-To-Back Axis AMG Magnet and 425 for the Larger Side-To-Side Axis AMG Magnet) for a given magnet configuration, as discussed below with respect to FIG. 12, $I_C$ represents the current command signal scaled in Amperes, and $G_{mag}$ represents an actual magnet gap signal scaled in millimeters between a pole face of a magnet and a reaction surface of a guide rail, which is determined from the sensed gap signal $G_m$.

Figure 5B:
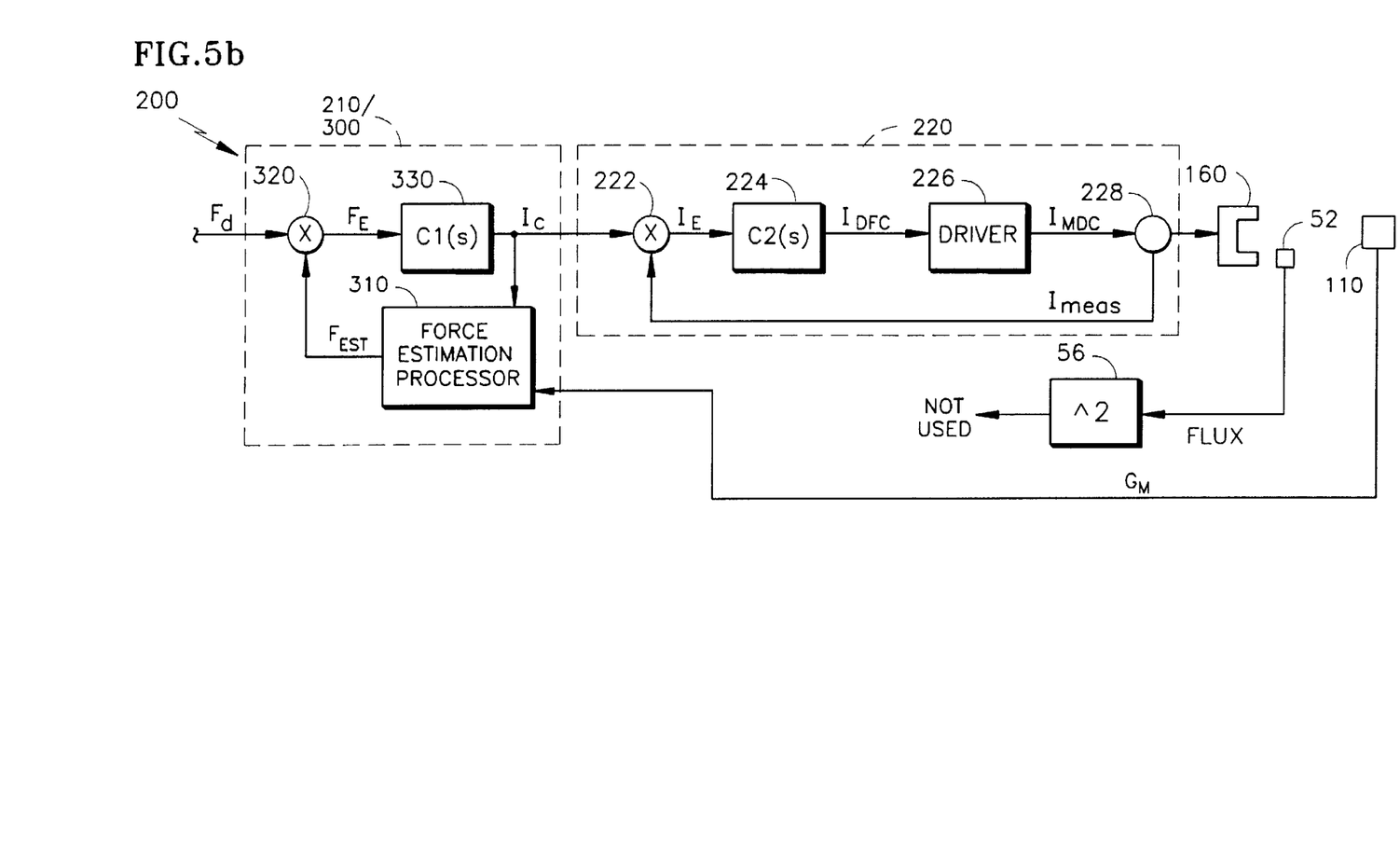
FIG. 5b is a block diagram of another embodiment of a force-estimation current command controller 210/300 which is one embodiment of the current command controller 200 in FIG. 4.

In the embodiment shown in FIG. 5b, the current command signal $I_C$ is fed to the force-estimation processor 310 instead of the sensed or measured magnet driver current signal $I_{meas}$ from a magnetic current sensor 228, if the bandwidth is high enough so the sensed or measured magnet driver current signal $I_{meas}$ follows the current command signal $I_C$. In operation, the force-estimation processor 310 responds to a feedback current command signal $I_C$ and the sensed gap signal $G_m$, for providing the force-estimation processor signal indicative of the estimation of the horizontal force to control the elevator car 12 with respect to the guide rails in the elevator hoistway. Otherwise, the embodiment is similar in design to that shown and described with respect to FIG. 5a above.

Figure 7:
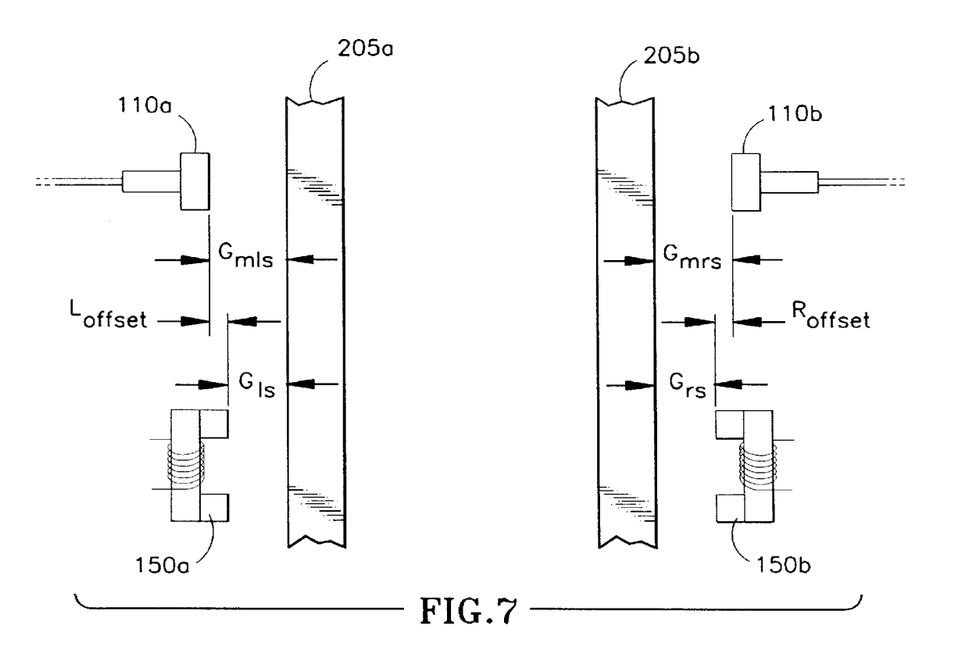
FIG. 7 is a diagram of a side-to-side configuration for the AMG elevator system.
Figure 8:
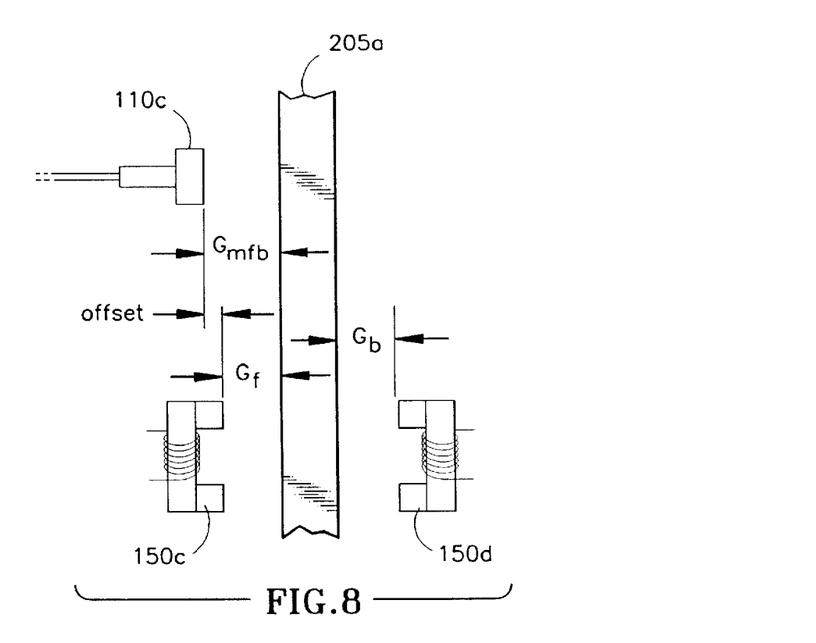
FIG. 8 is a diagram of a front-to-back configuration for the AMG elevator system.

FIGS. 7 and 8: Gap Sensor Processing Algorithm:

FIGS. 7 and 8 show a typical physical relationship between the magnet, the reaction surface and the position sensor. As discussed above, in order to estimate the force produced by the AMG and ARG electromagnets, the air gap length and magnet current for each magnet must be known. The magnet current is information readily available from the magnet driver electronics. In implementing the drivers, current feedback may be used to improve the response of the current control. In the case of a system that does not use current feedback, the current must still be monitored to insure that it stays within safe levels, and is therefore available for the force estimation technique.

Side-To-Side AMG Actuator Gaps:

The actual magnetic gap signal $G_{mag}$ includes the right side magnet gap $G_{rs}$ and the left side gap $G_{ls}$.

FIG. 7 shows a physical system configuration for a Side-to-Side axis. As shown, two position sensors 110a and 110b are not physically located on the pole faces of the electromagnets 150a, 150b. The two position sensors 110a and 110b are examples of the position sensors 110 in FIG. 2, without sensing magnetic flux of the electromagnets in the airgap between the pole faces and the guide rails, and are used since the gap for both left and right side magnets must be known even as the Distance Between the Guiderails (DBG) changes. The offset between the magnet gap and each position sensor 110a and 110b must be physically measured. This is shown and designated in FIG. 7 as $L_{offset}$ for the left side magnet and $R_{offset}$ for the right side magnet. The measured offsets $L_{offset}$ and $R_{offset}$ are a result of the mounting configuration of the magnets and the position sensor and do not change with system operation. The measured left gap is $G_{mls}$.

The left side gap $G_{ls}$ is determined using Equation 2, as shown below:

$$G_{ls} = G_{mls} - L_{offset} \quad \text{(Eq. 2)}.$$

The right side magnet gap $G_{rs}$ is determined using Equation 3, as shown below:

$$G_{rs} = G_{mrs} - R_{offset} \quad \text{(Eq. 3)}.$$

Note for the side-to-side configuration, the gap processing algorithm is identical for either side.

Front-To-Back AMG Actuator Gaps:

The actual magnetic gap signal $G_{mag}$ includes the front magnet gap $G_f$ and the back gap $G_b$, which must be determined.

FIG. 8 shows a physical system configuration for a front-to-back axis. As shown, a position sensor 110c is not physically located on the pole face of the electromagnet 150c. Note that there is only one position sensor 110c, which does not sense magnetic flux of the electromagnets in the airgap between the pole faces of the electromagnets and the guide rails, in the front-to-back axis and two magnets 150c,15d. Force estimation using Equation 1 requires gap information for each magnet. The guide rail may be a conventional ¾ T rail which has a highly uniform ¾ inch (1.9 centimeters) width, although the scope of the invention is not intended to be limited to any particular type of guide rail. The spacing of the front and back magnets is determined by the guide head hardware. Hence the sum of the front magnet gap $G_f$ and the back magnet gap $G_b$ is a constant total $G_t$. Therefore, once a measured front-to-back gap $G_{mfb}$ is measured, and the front magnet gap $G_f$ is determined, then the back magnet gap $G_b$ can also be determined knowing the constant total gap $G_t$.

As with the side-to-side magnets, there is an offset between the front magnet gap and the position sensor gap. This offset must also be physically measured and recorded as "offset". The position sensor 110c measures and provides the measured front-to-back gap $G_{mfb}$. The position sensor processing algorithm for the front magnet gap is the same as for each side magnet above.

The front magnet gap $G_f$ is determined using Equation 4, as shown below:

$$G_f = G_{mfb} - \text{offset} \tag{Eq. 4}$$

Knowing the front gap $G_f$ and the constant total gap $G_t$, the back gap $G_b$ is determined using Equation 5, as shown below:

$$G_b = G_t - G_f \tag{Eq. 5}$$

Figure 9:
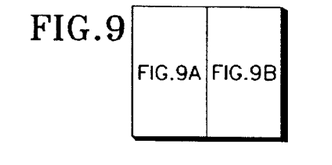
FIG. 9 shows how FIGS. 9A and 9B fit together to illustrate a hardware embodiment of a force estimation processor 310 in FIG. 5.

FIG. 9: Hardware Implementation of the Force-Estimation Processor 310

FIG. 9 shows a detailed circuit diagram of a hardware implementation of the force-estimation processor 310 of FIG. 5 for computing the force estimate for driving a pair of magnets. The circuit is designed to be easily configured for either Front-To-Back or Side-To-Side Operation by setting a jumper shown in FIG. 9A to either S/S for side-to-side or F/B for front-to-back, as shown.

Side-to-Side Gaps:

The jumper is set to S/S for side-to-side position.

A Left Side Magnet Gap $G_{ls}$

The operational amplifiers U1-A and U1-B process the gap information for a left side magnet 150a in FIG. 7 using Equation 3.

Gap 1 represents a measured left side gap signal $G_{mls}$ and is a voltage output provided directly from the left side position sensor 110a in FIG. 7. The measured left side gap signal $G_{mls}$ is scaled to give a 0 to 10 volt signal proportional to a 0 to 10 millimeter gap. The operational amplifier U1-A has a potentiometer P1 associated therewith that is adjusted to calibrate the measured left side gap signal $G_{mls}$, so that the voltage at test point node TP1 equals a negative of the measured offset between the position sensor and the magnet gap. The output from the operational amplifier U1-A represents a negative an actual left side magnet gap $-G_{ls}$.

The operational amplifier U1-A is configured as a summing junction computing:

$$-1^* (G_{mls} + -L_{offset})$$

where a left offset voltage $L_{offset}$ is negative. In addition, the operational amplifier U1-A provides a single pole lag filter having a capacitor C20 and a resistor R2 with a breakpoint set at 30 Hz to reduce noise. The operational amplifier U1-B is a unity gain inverting amplifier. The output of the operational amplifier U1-B represents an actual left side magnet gap $G_{ls}$.

A Right Side Magnet Gap $G_{rs}$

Operational amplifiers U1-C and U1-D process the gap information for a right side magnet 150b, shown in FIG. 7, using Equation 4. Gap 2 represents a measured right side gap signal $G_{mrs}$ and is the voltage output directly from the right side position sensor 110b. Similar to the calibration discussed above, the operational amplifier U1-C has a potentiometer P2 that is adjusted to calibrate the measured right side gap signal $G_{mrs}$ so that the voltage at a test point node TP2 equals the negative of the measured offset between the position sensor and the magnet gap. The output from the operational amplifier U1-D represents an actual right side magnet gap $G_{rs}$.

Front-To-Back Gaps:

The jumper is set to F/B for front-to-back position.

A Front Magnet Gap $G_f$

The operational amplifiers U1-A and U1-B process the gap information for a front magnet 150c shown in FIG. 8 using Equation 5. Gap 1 represents a measured front-to-back gap signal $G_{mfb}$ and is the voltage output directly from the position sensor 110c. Calibration by adjustment of P1 is the same as for the left side magnet 150a (FIG. 7), as discussed above. The output from the operational amplifier U1-B is an actual front magnet gap $G_f$.

A Back Magnet Gap $G_b$

The operational amplifiers U1-C and U1-D process the gap information for a back magnet 150d using a combination of Equation 5 and Equation 6 shown below. The circuit in FIG. 9 processes the actual back magnet gap $G_b$ using Equations 4 and 5, as follows:

$$G_f = G_{mfb} - \text{offset} \tag{Eq. 4}$$

and $$G_b = G_t - G_f \tag{Eq. 5}$$

Substituting the actual front magnet gap $G_f$ from Equation 4 into Equation 5 yields:

$$G_t - G_b = G_{mfb} - \text{offset}$$

Solving for the actual back magnet gap $G_b$ yields:

$$G_b = -G_{mfb} + \text{offset} + G_t \tag{Eq. 6}$$

Because there is only one sensor, the Gap 2 input is connected to the Gap 1 input, and this is the voltage output directly from the sole front-to-back position sensor 110c in FIG. 8. The sensor output is scaled to give a 0 to 10 volt signal equal to a 0 to 10 millimeter gap. To calibrate the position processing, the potentiometer P2 is adjusted so that the voltage at node TP2 equals a minus of a sum of the constant total gap $G_t$ and the measured front-to-back offset $G_{mfb}$ between the position sensor 110c and the magnet gap. The output from the operational amplifier U1-C then becomes the back gap $G_b$.

The operational amplifier U1-C is configured as a summing junction computing the actual back magnet gap $G_b$ of Equation 6.

In addition, the operational amplifier U1-C provides a single pole lag filter having a capacitor C21 and a resistor R1 with a breakpoint set at 30 Hz to reduce noise. The operational amplifier U1-D is jumpered-out (i.e. disabled) for the front-to-back configuration.

Force Estimation Network

Once the gap has been successfully processed, the resulting signals must be processed with the corresponding sensed or command currents for the magnets to generate force estimates by using AD534 multipliers U2, U3, U4 and U5.

For the given values of the proportionality constant $K_{mag}$ above, the current sense signal must be scaled to 1 volt per Ampere. If the available current sensed signal is scaled differently, the proportionality constant $K_{mag}$ would be adjusted accordingly by recalculating Equation 1 for the given data.

The AD534 multipliers U2, U3, U4 and U5 with the following transfer function are used to divide the measured current $I_{meas}$ by the actual magnet gap $G_{mag}$:

$$(X1-X2)*(Y1-Y2)=10*(Z1-Z2) \quad \text{(Eq. 7)},$$

where X1, X2, Y1, Y2, Z1, Z2 represent the inputs for the AD534 multipliers U2, U3, U4, U5.

By setting the X2, Y1 and Z2 inputs to zero, Equation 7 yields:

$$Y2=-10*Z1/X1 \quad \text{(Eq. 8)}$$

Figure 9A:
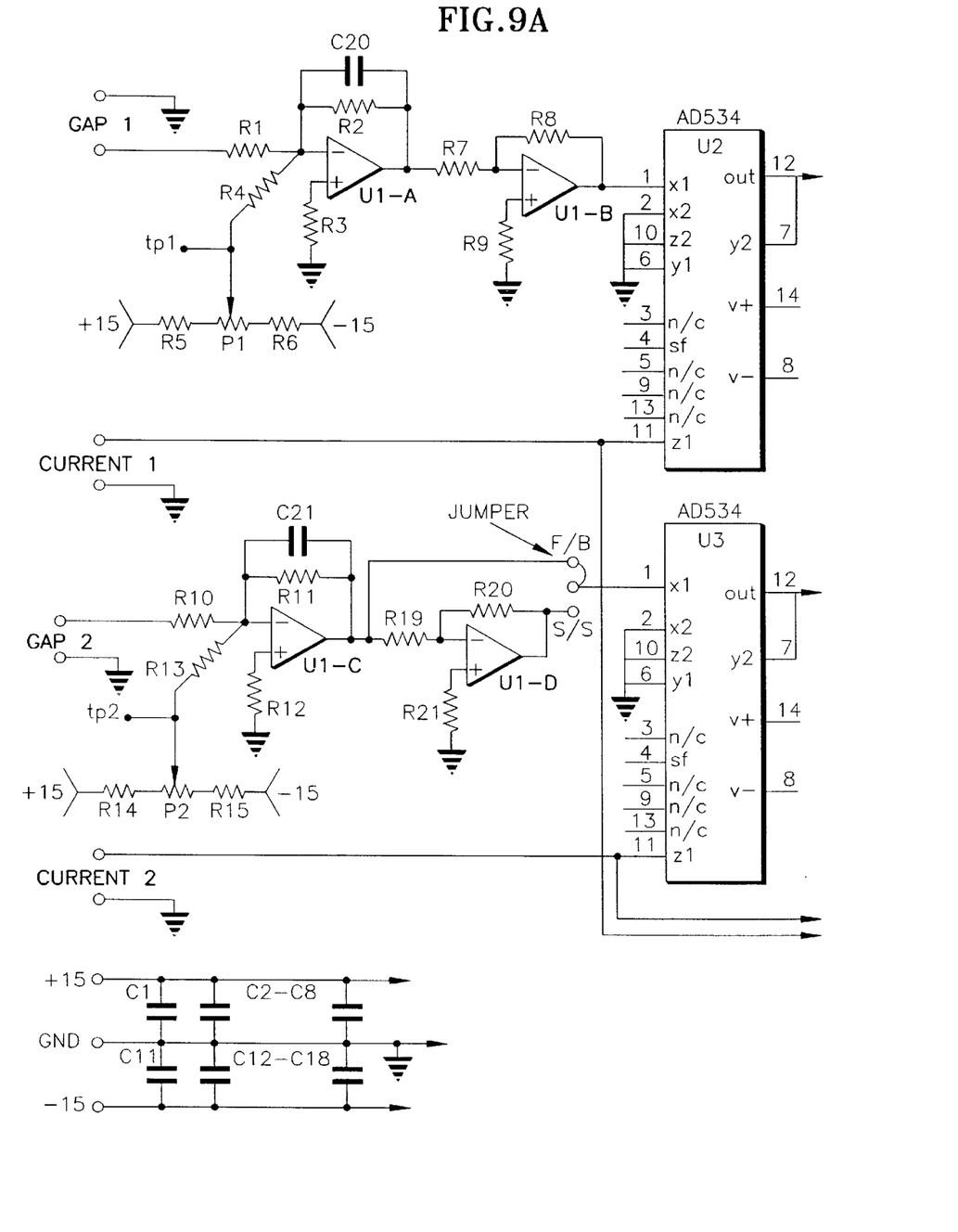
Figure 9B:
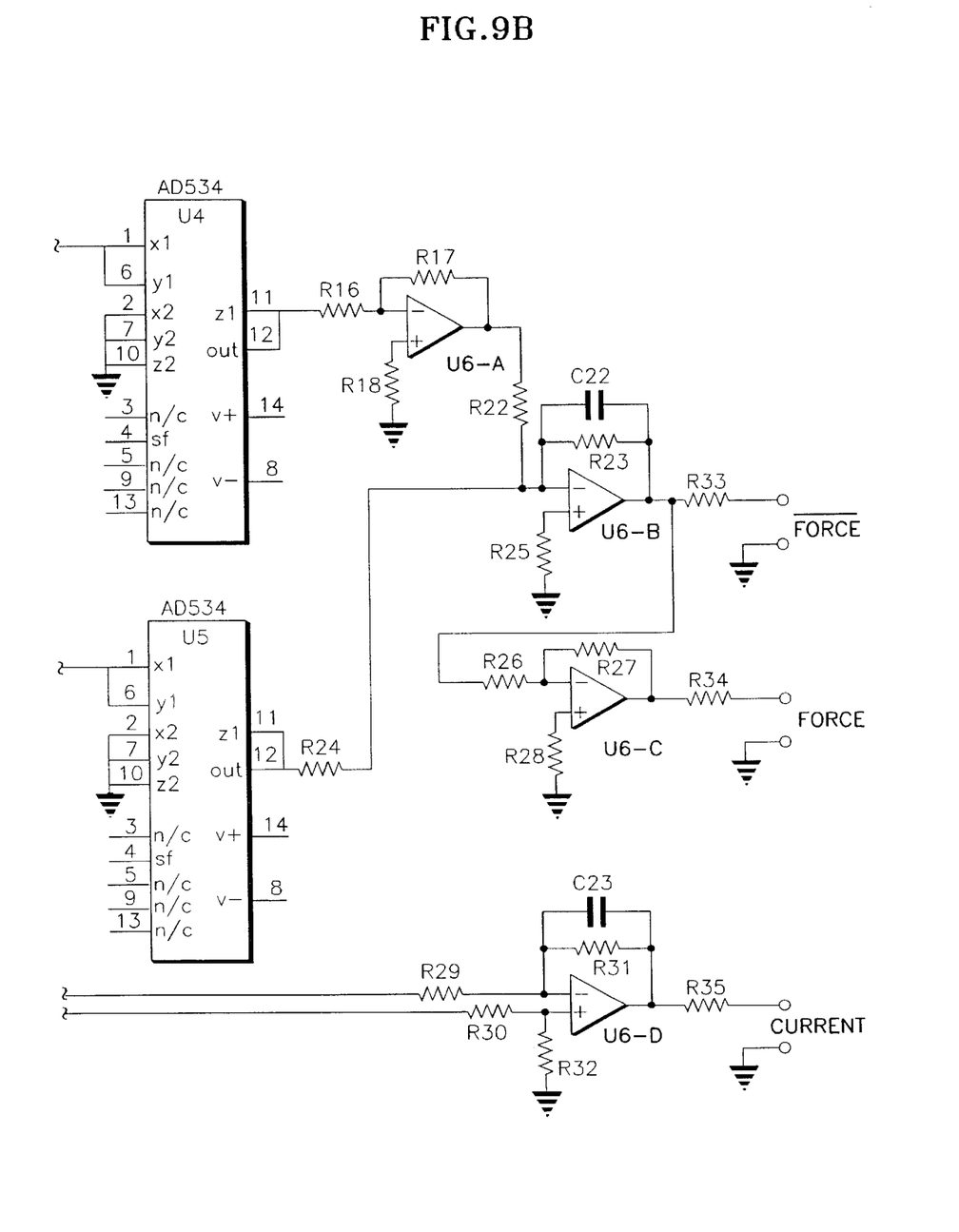

As shown in FIG. 9A, the measured current signal $I_{meas}$ is fed into the Z1 input and the actual magnet gap signal $G_{mag}$ is fed into the X1 input, and the output signal becomes:

$$-10*I_{meas}/G_{mag}$$

The output signal from the AD534 multiplier U2 is fed into the AD534 multiplier U4 to perform a squaring function.

$$(X1-X2)*(Y1-Y2)=10*(Z1-Z2) \quad \text{(Eq. 7)}$$

Setting the X2, Y2 and Z2 inputs to zero and sending the signal 10*I/G to both the X1 and Y1 inputs yields:

$$Z1=10*I_{meas}^2/G_{mag}^2 \quad \text{(Equivalent with scaling to Eq. 1)}$$

The AD534 multipliers U2 and U3 divide the current by the gap signal. The AD534 multipliers U4 and U5 are configured to square their input signals. The operational amplifier U6-A inverts the force estimate for channel 1, and the operational amplifier U6-B sums the two channels so that a positive signal represents the front (or Left Side) magnet force and a negative signal represents the back (or Right Side) magnet force. The operational amplifier U6-B is also configured as a first order lag filter having a capacitor C22 and a resistor R23 with a breakpoint set to 300 Hz to reduce noise without significant phase loss at 30 Hz. The operational amplifier U6-B also scales the output, as explained below.

Equation 1 determines the force in Newtons for the proportionality constant $K_{mag}$ of 100 or 425 for the two different AMG magnets 160 shown in FIG. 2. For a force feedback loop, the Force in Newtons must be scaled to a reasonable predetermined voltage range. Since the front-to-back magnet produces on the order of 650 Newtons, a reasonable output voltage might be 6.5 volts. In this case, the proportionality constant $K_{mag}$ would become 1, and the operational amplifier U6-B would be set to a gain of 1. The side-to-side magnet produces 1300 Newtons. If the output is scaled to 6.5 volts, then the proportionality constant $K_{mag}$ for the side-to-side magnet would become 425/200 or 2.125. In this case, the operational amplifier U6-B would be set to a gain of 2.125. The operational amplifier U6-C inverts this signal and provides it as the force-estimation processor signal from the force estimation processor 310 in FIG. 5.

Figure 10:
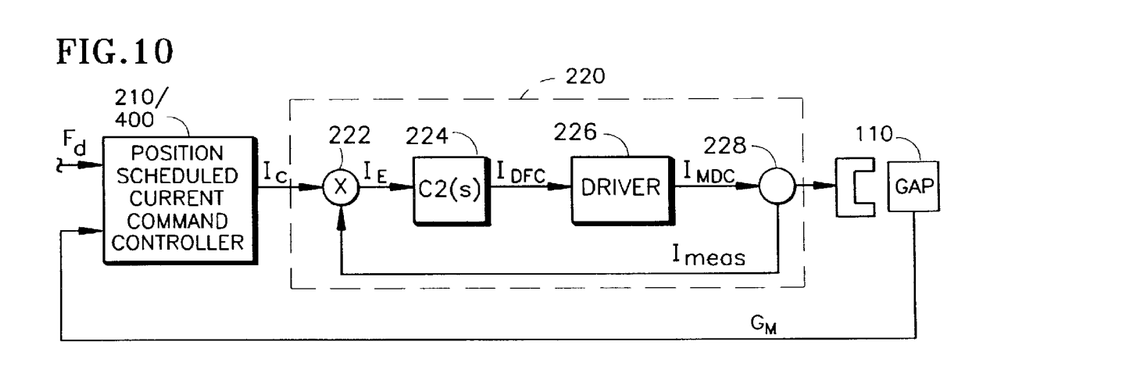
FIG. 10 is a block diagram of a position-scheduled current command controller 210/400 which is another embodiment of the current command controller 200 in FIG. 4.
Figure 11:
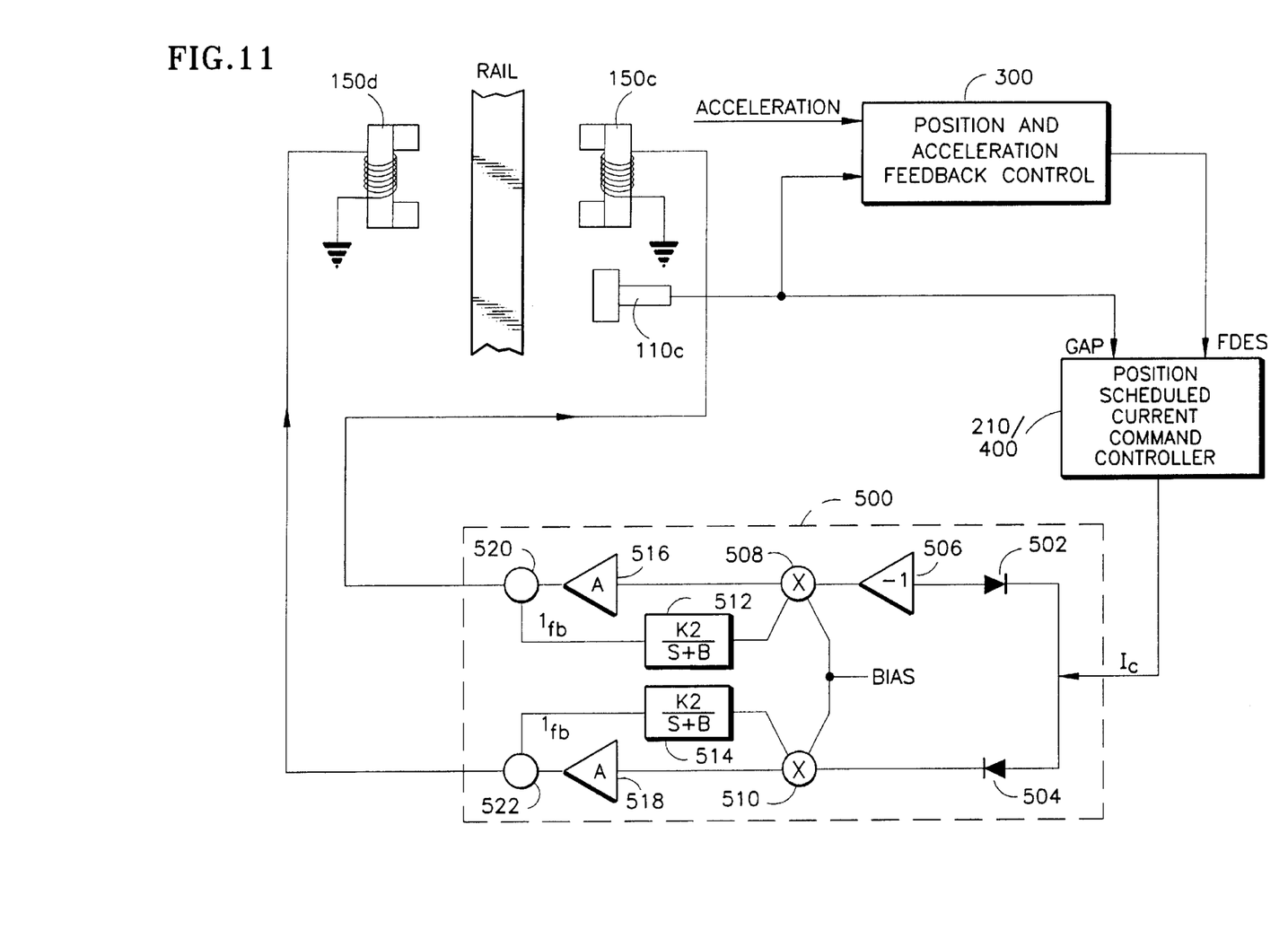
FIG. 11 is a block diagram of the position-scheduled current command controller 210/400 shown in FIG. 10 and the coordinated controller 100 shown in FIG. 2.

FIGS. 10–11: Position-Scheduled Current Command Controller 400

FIG. 10 shows an embodiment of the invention in which the current command controller 200 has a position-scheduled current command controller 210/400, which may be implemented in hardware or software. The scope of the invention is not intended to be limited to any particular embodiment of the position-scheduled current command controller 400, or whether it is implemented in hardware or software, or a combination thereof.

In the embodiment shown in FIG. 10, the position-scheduled current command controller 400 is implemented in software using a microprocessor architecture similar to that shown in FIG. 6.

In FIG. 10, the position-scheduled current controller 210/400 responds to the force command signal $F_d$ from the highest level control (i.e., outer position and/or acceleration loop) and the sensed gap signal $G_m$ fed back from a gap sensor 110 of the magnet pair of interest, and uses Equation 1 to determine and provide a position-scheduled current controller signal as a current command $I_C$ to the magnet driver circuit 220. The position-scheduled current controller 210/400 must determine the actual magnet gap signal $G_{mag}$ from the sensed gap signal $G_m$, as discussed above.

As also discussed above, the magnet driver circuit 220 is known in the art of elevator systems and similar to that discussed above with respect to FIG. 5.

In operation, the position-scheduled current command controller 210/400 receives the force command signal $F_d$, and the sensed gap signal $G_m$, and generates a position-scheduled current command controller as the current command $I_c$ to the magnet driver circuit 200, using a technique that requires the current output of the magnet driver circuit 220 to follow accurately the current command signal $I_c$. The method for controlling may include the following steps:

Step 1: Determine the magnet to energize

Based on the sign of the desired force request, one can determine the appropriate electromagnet to energize. For example, a positive force indicates to energize the front or right side magnet, while a negative force indicates to energize the back or left side magnet.

Step 2: Determine the actual magnet gap $G_{mag}$

Determine from the measured gap sensors what the actual magnet gap $G_{mag}$ for the specific magnet identified in Step 1. This position sensor processing follows the same procedure as outlined in the prior discussion with respect to FIGS. 6 and 7 of the gap sensor processing algorithm.

Step 3: Determine the command currents for the magnets

Based on steps (1) and (2), determine the command currents for all magnets using the idealized model of Equation 1 and the empirically derived magnet proportionality constant $K_{mag}$, that is, $$I_C = \text{square root } (F_d/K_{mag})*G_{mag}$$

Attached as Table 1 at the end of the specification is the software code for the position-scheduled current command controller 210/400.

FIG. 11 shows the position-scheduled current command controller 210/400 in combination with the position and acceleration feedback control 300 corresponding to reference numeral 130 in FIG. 2, magnets 150c, 150d in FIG. 8, position sensor 110c in FIG. 8 and a magnet driver 500 similar to the magnet driver circuit 200 in FIG. 10. As shown, the magnet driver circuit 500 responds to the current command signal $I_C$, which represents a position-scheduled current command, and provides a magnet driver signal to magnets 150c, 150d for front-to-back control of an elevator car (not shown). The magnet driver circuit 500 includes a pair of diodes 502, 504, an inverter 506, two comparators 508, 510, which are simultaneously biased, lag filters 512, 514, amplifiers 516, 518, and nodes 520, 522 for feeding back left front-to-back signals $l_{fb}$ to the lag filters 512, 514.

FIG. 12:

FIG. 12 shows a graph of side-to-side AMG magnet performance used to derive the Equation 1.

In general, the two different magnet configurations of FIGS. 7 and 8 were tested in a testing rig that holds the magnets a fixed distance from an elevator guide rail (reaction surface) in a static relationship. A fixture was equipped to measure a force produced using precision load cells and a magnetic field using Hall effect sensors while the magnet was energized with a DC current. The experiment was conducted for gaps from 2 to 10 millimeters in 2 millimeter increments and currents from 0 to 20 Amperes in 2 Ampere increments. The data was analyzed and an empirical model of Force versus Current and Gap was derived by curve fitting. FIG. 12 provides the graph of a set of data tested using the model of the derived Equation 1:

$$\text{Force} = K_{mag} * (I_C/G_{mag})^2,$$

where the Force represents a force signal scaled in Newtons, $K_{mag}$ represents a proportionality constant for a given magnet configuration, (100 for the smaller Front-To-Back Axis AMG Magnet and 425 for the Larger Side-To-Side Axis AMG Magnet), $I_C$ represents a desired force compensated current command signal scaled in Amperes, and $G_{mag}$ (also referred to as $G_{meas}$ above) represents the actual magnet gap between a pole face and a reaction surface scaled in millimeters.

For a range of gaps between 2 to 10 millimeters and a range of magnet currents between 0 to 20 Amperes, within the rated force limits of the electromagnets, Equation 1 models the force generated within less than 10% from the load cell measured force. The plot in FIG. 12 is for the 1300 Newton Side-To-Side AMG magnet operating at a 6 millimeter air gap. The asterisk "*" in FIG. 12 indicates where the current measurements were taken. Both of these cases are outside the normal operating range of the system. This estimation error using current and gap is comparable to the error associated with the Hall effect sensor derived force estimation. These force errors are insignificant in active elevator suspension systems that typically have outer feedback loops (based on gap sensing and/or acceleration signals) closed around this inner force loop.

Scope of the Invention

It will thus be seen that the objects set forth above, and those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It should be realized that the position and feedback controllers 130, 300 of FIGS. 2 and 11, respectively, may take forms other than indicated, e.g., according to a "learned-rail" approach shown in U.S. Ser. No. 08/292,660, as well as that disclosed in U.S. Pat. Nos. 5,294,757; 5,304,751 and 5,308,938.

Other applications include any system that uses an electromagnet to produce a force across a large air gap. The electromagnet force may be either attractive or repulsive. Specific applications are envisioned in the field of magnetic levitation trains or shuttles, and magnetic bearings.

It is also to be understood that the following claims are intended to cover all of the generic and specific features of the invention herein described and all statements of the scope of the invention which, as a matter of language, might be said to fall therebetween.

What is claimed is:

1. An elevator system for controlling horizontal movement of an elevator car with respect to guide rails in an elevator hoistway with electromagnets of the elevator car, comprising:

a force-estimation or position-scheduled current command controller, responsive to a desired force command signal containing sensed position feedback control information sensed without sensing magnetic flux between pole faces of the electromagnets and the guide rails and containing sensed acceleration feedback control information, said force-estimation or position-scheduled current command controller further responsive to a sensed gap signal containing information about actual gaps between electromagnets of the elevator car and the guide rails, for providing a force-estimation or position-scheduled current command controller signal; and a magnet driver circuit, responsive to the force-estimation or position-scheduled current command controller signal, for providing a magnet driver circuit signal to control the horizontal movement of the elevator car with respect to the guide rails in the elevator hoistway.

2. An elevator system according to claim 1, wherein the force-estimation or position-scheduled current command controller comprises:

a force-estimation processor, responsive to the sensed gap signal, and further responsive to a sensed magnet driver current signal, for providing a force-estimation processor signal;

a force comparator, responsive to the force-estimation processor signal, and further responsive to the force command signal, for providing a force comparator signal; and a force feedback compensation processor, responsive to the force comparator signal, for providing a force feedback compensation processor signal as a current command to the magnet driver circuit.

3. An elevator system according to claim 2, wherein the force-estimation processor is implemented with hardware and further comprises:

a first operational amplifier, responsive to the sensed gap signal, for providing an operationally-amplified gap signal;

a multiplier circuit, responsive to the operationally-amplified gap signal, and further responsive to the sensed magnet driver current signal, for providing a multiplier circuit signal; and a second operational amplifier, responsive to the multiplier circuit signal, for providing a second operationally-amplified multiplied signal to the force comparator.

4. An elevator system according to claim 1, wherein the force-estimation or position-scheduled current command controller is a position-scheduled current command controller, responsive to the force command signal, and further responsive to the sensed gap signal, for providing a position-scheduled current command control signal as a current command to the magnet driver circuit.

5. An elevator system according to claim 1, wherein the magnet driver circuit further comprises:

a current-error comparator, responsive to the force-estimation or position-scheduled current control signal indicative of a current command, and further responsive to a sensed magnet driver current signal, for providing a current error signal;

a current feedback compensation processor, responsive to the current error signal, for providing a current feedback compensation processor signal;

a driver circuit, responsive to the current feedback compensation processor signal, for providing a driver circuit signal to a magnet that provides a magnetic force to control said horizontal movement of the elevator car with respect to the guide rail in the elevator hoistway; and a current sensor, responsive to the driver circuit signal, for providing the sensed magnet driver current signal to the current-error comparator.

6. An elevator system according to claim 1, wherein the force command signal is indicative of a commanded horizontal movement of the elevator car with respect to the guide rails in the elevator hoistway.

7. An elevator system according to claim 1, wherein the sensed gap signal is indicative of an actual gap of the elevator car with respect to the guide rail in the elevator hoistway.

8. An elevator system according to claim 1, wherein the force-estimation or position-scheduled current command controller signal is indicative of a force-estimation or position-scheduled current command for controlling said horizontal movement of the elevator car with respect to the guide rail in the elevator hoistway.

9. An elevator system according to claim 1, wherein the magnet driver circuit signal is indicative of a current for driving the magnet to produce a magnetic force to control the horizontal movement of the elevator car with respect to the guide rail in the elevator hoistway.

10. An elevator system for controlling horizontal movement of an elevator car with respect to guide rails in an elevator hoistway, comprising:

a force-estimation or position-scheduled current command controller, responsive to a desired force command signal, and further responsive to a sensed gap signal, for providing a force-estimation or position-scheduled current command controller signal; and a magnet driver circuit, responsive to the force-estimation or position-scheduled current command controller signal, for providing a magnet driver circuit signal to control the horizontal movement of the elevator car with respect to the guide rails in the elevator hoistway, whereby the horizontal movement of the elevator car is controlled without sensing magnetic flux;

wherein the force-estimation or position-scheduled current command controller comprises:

a force-estimation processor, responsive to the sensed gap signal, and further responsive to the force-estimation or position-scheduled current command controller signal, for providing a force-estimation processor signal;

a force comparator, responsive to the force-estimation processor signal, and further responsive to the desired force command signal, for providing a force comparator signal; and a force feedback compensation processor, responsive to the force comparator signal, for providing a force feedback compensation processor signal as a current command to the magnet driver circuit.

11. A system for controlling movement of a first object with respect to a second object, comprising:

a force-estimation or position-scheduled current command controller, responsive to a desired force command signal containing position and acceleration feedback control information, and further responsive to a sensed gap signal containing information about actual gaps between electromagnets of the first object and a guide member of the second object, for providing a force-estimation or position-scheduled current command controller signal; and a magnet driver circuit, responsive to the force-estimation or position-scheduled current command controller signal, for providing a magnet driver circuit signal to control the horizontal movement of the first object with respect to the second object, whereby the horizontal movement of the first object is controlled without sensing magnetic flux of the electromagnets.

12. A system for controlling movement of a first object with respect to a second object, comprising:

a force-estimation or position-scheduled current command controller, responsive to a desired force command signal, and further responsive to a sensed gap signal, for providing a force-estimation or position-scheduled current command controller signal; and a magnet driver circuit, responsive to the force-estimation or position-scheduled current command controller signal, for providing a magnet driver circuit signal to control the horizontal movement of the first object with respect to the second object, whereby the horizontal movement of the first object is controlled without sensing magnetic flux;

wherein the force-estimation or position-scheduled current command controller comprises:

a force-estimation processor, responsive to the sensed gap signal, and further responsive to a sensed magnet driver current signal, for providing a force-estimation processor signal;

a force comparator, responsive to the force-estimation processor signal, and further responsive to the desired force command signal, for providing a force comparator signal; and a force feedback compensation processor, responsive to the force comparator signal, for providing a force feedback compensation processor signal as a current command to the magnet driver circuit.

13. A system according to claim 11, wherein the force-estimation or position-scheduled current command controller is a position-scheduled current command controller, responsive to the force command signal, and further responsive to the sensed gap signal, for providing a position-scheduled current command control signal as a current command to the magnet driver circuit.

* * * * *